T. W. COSTELLO.
SPONGE RUBBER CUSHION TIRE.
APPLICATION FILED SEPT. 6, 1919.
1,371,472.
Patented Mar. 15, 1921.
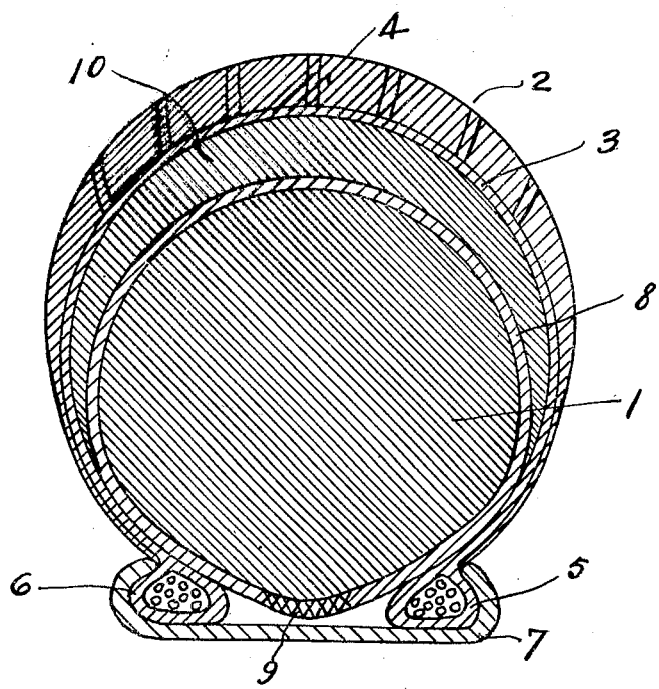
INVENTOR.
Thomas William Costello.

UNITED STATES PATENT OFFICE.

THOMAS WILLIAM COSTELLO, OF SAN FRANCISCO, CALIFORNIA.

SPONGE-RUBBER CUSHION-TIRE.

1,371,472.   Specification of Letters Patent.   Patented Mar. 15, 1921.

Application filed September 6, 1919. Serial No. 322,052.

*To all whom it may concern:*

Be it known that I, THOMAS WILLIAM COSTELLO, a citizen of the United States, and a resident of the city of San Francisco, in the State of California, United States of America, have invented certain new and useful Improvements in Sponge-Rubber Cushion-Tires, of which the following is a specification.

My invention relates to improvements in sponge rubber cushion tires, such as are used on automobiles, aeroplanes, motor cycles, bicycles, and other moving vehicles, and the object of my invention is to provide a tire of this character the construction of which is such that the great heat and friction caused through the chafing, slipping, and rubbing of the elements constituting such tires at the present time is prevented, thus eliminating the possibility of disintegration and crumbling of the spongy rubber core and consequent failure of the tire.

I attain this object by the construction illustrated in the acompanying drawing in which the figure shows a cross section of the tire.

The tire consists of what may be termed a filler-core 1 of yieldable spongy rubber, circular in shape, which core may be made of different sizes to conform to the curvature of the outer casing 2 of which it forms a part, this casing being constructed of the usual fabric, indicated by the numeral 3, and the rubber tread 4, and being provided with the usual beads 5 and 6 by means of which it is held in the clenches of the rim 7. The filler-core 1 is held in position within the outer casing by means of a canvas-fabric container 8 which also serves the purpose of preventing the filler-core from being compressed beyond the limits of the canvas-fabric container itself, so that abnormal flattening of the filler-core due to the load is obviated, while the tendency of the outer casing to stretch is lessened since the outward bulge of the outer casing is obviously limited to the amount of compression which can be imposed upon the filler-core within the limits of the container. The container 8 is coated or calendered on both sides with a sheet of gum-rubber composition the use of which affords protection against friction and consequent heat, and the ends of the container are securely sewed together by means of strong cords 9 insulated with bees-wax.

Disposed between the outer casing and the container 8 is a cushion 10 of spongy rubber, which cushion is formed crescent shape so as to conform itself to the greater part of the outer circumference of the container 8 and the inner circumference of the outer casing 1, the objects of this cushion being— (*a*) to provide a resilient, yielding, and non-heating cushion to assist in carrying the filler-core 1 and its container 8 and to provide a cushion therefor; (*b*) to provide a means of preventing separation of the filler-core and its container from the inner wall of the outer casing due to the stretching of the cotton or cord fabric carcass of the casing from weight, strain, and other conditions contributing to the expansion of the outer casing and the effect of the tire in motion caused by centrifugal force, vibration, oscillation, and friction, all of which causes tend to separate the filler-core from the inner wall of the outer casing; (*c*) to provide a means for automatically taking care of the defect that would be caused by the contraction and expansion constantly occurring between the spongy rubber filler-core and its canvas fabric container and the inner surface of the outer casing, due to the alternate compression and release of the spongy rubber forming the core, thus furnishing a useful intermediate element between the casing and its filler, and which element thus automatically fills the space between the casing and the filler, rendering them independent of each other in so far as they would be affected by the contraction and expansion produced by the causes just referred to.

The cushion 10 is held in position between the outer casing and the filler-core by the vulcanization of both sides of the cushion itself to the inner wall of the outer casing and to the outer side of the container 8, while the container 8 is also vulcanized to the filler-core and to the outer casing, from which it will be seen that the outer casing, the spongy rubber cushion, the spongy rubber filler-core, and the canvas fabric container are vulcanized together and combined in one integral unit, thus producing a semisolid, non-puncturable, spongy rubber cushion tire which is very resilient in its motion and performance when in operation, and which is proof against outward bursting from inside pressure.

What I claim as my invention is:—

1. In a tire, the combination of an outer casing of the clencher type, of a two part filler for said casing comprising a sponge rubber core substantially circular in cross section and inclosed in a closely fitting non-elastic fabric container and adapted to be inserted in the casing and seated against the clencher or heel portions thereof, and a crescent-shaped cushion element of the same material as the core adapted to be introduced between the tread portions of the core and casing in direct contact with each to completely fill the space therebetween and to hold the core in proper position within the casing.

2. A two-part filler for tire casings comprising a sponge rubber core substantially circular in cross section and inclosed in a closely fitting fabric container, and a separately formed sponge rubber cushion element crescent shaped in cross section, said parts being of a size to completely fill the interior of a tire casing when assembled therein with the core located remote from the tread portion of the casing and the cushion element held in compression between the tread portions of said core and casing in direct contact with each.

Dated at San Francisco, Cal., U. S. A., this 15th day of August, 1919.

THOMAS WILLIAM COSTELLO.